United States Patent [19]
Leonard

[11] 3,931,117
[45] Jan. 6, 1976

[54] COATING POWDERS FOR PROTECTIVE FILMS BASED ON ε-CAPROLACTAM-BLOCKED ISOCYANATES

[75] Inventor: David P. Leonard, Overland Park, Kans.

[73] Assignee: Cook Paint and Varnish Company, Kansas City, Mo.

[22] Filed: Aug. 1, 1974

[21] Appl. No.: 493,887

[52] U.S. Cl....260/77.5 TB; 260/75 NK; 260/77.5 AB; 260/77.5 AC; 260/77.5 AN; 427/25
[51] Int. Cl.² .................. C08G 18/80; C08G 18/42
[58] Field of Search...260/77.5 TB, 77.5 AN, 77.5 CR, 260/75 NK

[56] References Cited
UNITED STATES PATENTS

| | | | |
|---|---|---|---|
| 3,210,272 | 10/1965 | Foster et al. | 210/39 |
| 3,659,003 | 4/1972 | Johnson et al. | 260/859 |
| 3,660,355 | 5/1972 | Johnson et al. | 260/77.5 CR |
| 3,660,359 | 5/1972 | Labana | 260/77.5 TB |
| 3,819,586 | 6/1974 | Rudolph et al. | 260/77.5 TB |
| 3,822,240 | 7/1974 | Schmitt et al. | 260/77.5 TB |

*Primary Examiner*—H. S. Cockeram
*Attorney, Agent, or Firm*—Cushman, Darby & Cushman

[57] ABSTRACT

Coating powders for use in the preparation of protective films comprising a mixture of a caprolactam-blocked organic polyisocyanate and a hydroxy-containing polyester or a hydroxy-containing acrylic or methacrylic polymer, wherein the acrylic or methacrylic polymer is derived from the polymerization reaction of a hydroxy lower alkyl acrylate or methacrylate, one or more lower alkyl acrylates or methacrylates, and optionally styrene or vinyl toluene. The proportions of the ε-caprolactam-blocked organic polyisocyanates and the hydroxy-containing polyesters or acrylic or methacrylic polymers in the mixture are such that there are about 0.8 to 1.20 blocked isocyanate groups for each hydroxy group in the polyester or acrylic or methacrylic polymer.

4 Claims, No Drawings

COATING POWDERS FOR PROTECTIVE FILMS BASED ON ε-CAPROLACTAM-BLOCKED ISOCYANATES

BACKGROUND OF THE INVENTION

1. Field of the Invention

The present invention relates to novel coating powders for use in the preparation of protective films. In particular, the present invention relates to solid, non-caking, electrostatically sprayable coating powders that are conveniently and easily handled, which upon heating cure to provide protective films having outstanding properties

2. Description of the Prior Art

Powder coatings have been widely used since the late 1950's. Initially, one-component polyurethane coating systems were used, which involved stable isocyanate-terminated prepolymers that were cured by means of the reaction of the free isocyanate group with water or atmospheric moisture.

Later, "blocked" isocyanates began to be used in coating systems. These early "blocked" isocyanate systems involved the reaction of polyisocyanates with mono-functional hydroxy-containing compounds ("blocking compounds") to give products that did not react with hydroxy-containing compounds at room temperature, but at elevated temperatures the hydroxy-containing "blocking" group was eliminated regenerating the isocyanate groups which were then available for cross-linking in the unusual manner. Phenols were widely used in these early systems. Generally, however, the phenol-blocking agents were found to be somewhat objectionable since they gave blocked polyisocyanates that required higher temperatures to dissociate. Although these blocked polyisocyanates are sensitive, in general, to heat, they have the advantage of not being as sensitive to moisture as other types of urethanes. Consequently, they may be exposed for considerable periods of time to atmospheric moisture without any significant danger of decomposition. They also have the advantage over the moisture-cured urethanes in being able to be formulated very near the 1:1 isocyanate:hydroxy ratio, thereby avoiding the formation of urea groups in the structure of the final polymerized coating. Additionally, they are easily handled and applied.

It has now been surprisingly found that caprolactam "blocked" isocyanate prepolymers can be used as cross-linking agents in hydroxy-containing powders that are capable of forming protective films when heated. Upon reaction of a suitable polyisocyanate with caprolactam, there is obtained a blocked isocyanate prepolymer which is solid and non-caking and can thus be easily formulated with solid hydroxy-containing acrylic, methacrylic or polyester resins.

The resulting powder coating can easily be cured by heating the powder film to about 325°–400°F whereupon the free isocyanate groups are regenerated and react with the hydroxy-containing polyester or acrylic or methacrylic resins incorporated in the powder coatings resulting in the formation of protective films having urethane linkages. It has been found that the present blocking system for powder coatings offers unique and outstanding advantages when compared to the use of polyisocyanates blocked with other blocking agents, such as methyl ethyl ketoxime, phenol, and alcohols, since the caprolactam-blocked polyisocyanates of the present invention have better flow and leveling of the protective film before final curing is completed. Further, it has been surprisingly found that the caprolactam-blocked organic polyisocyanates of the present invention do not "gas" during the curing process. It will be recognized by those skilled in the art that this avoids the formation of pin-holes and other objectionable surface patterns in the finished protective film, which commonly occur when conventional blocking agents are used with organic polyisocyanates.

Further, since regeneration of the free isocyanate groups from the blocked organic polyisocyanates occurs at a slower rate than with the conventional blocking agents, thicker films may be obtained.

More importantly, the instant blocking systems admirably satisfy the requirements for powder coatings in that they are solid, non-caking materials which can be easily electrostatically sprayed onto various articles and objects.

The present invention thus provides a unique composition ideally suited for use in the preparation of protective films.

SUMMARY OF THE INVENTION

The present invention provides a composition for use in the preparation of protective films comprising a mixture of a caprolactam-blocked organic polyisocyanate, and a hydroxy-containing polyester or a hydroxy-containing acrylic or methacylic polymer, wherein the polymer is derived from the reaction of a hydroxy lower alkyl acrylate or methacrylate, a lower alkyl acrylate or methacrylate, and optionally styrene or vinyl toluene, the polyisocyanate being present in sufficient quantity in the coating powder to provide from about 0.8 to 1.20 blocked isocyanate groups for each hydroxy group in the polyester or acrylic or methacrylic polymer.

The caprolactam-blocked organic polyisocyanates are prepared from the reaction of ε-caprolactam with various aliphatic or aromatic ployisocyanates or polyisocyanate prepolymers derived from the condensation of a hydroxy-containing polyester or polyhydric alcohols and one or more of the preferred aliphatic or aromatic polyisocyanates, or mixtures thereof.

DETAILED DESCRIPTION OF THE INVENTION

The present invention provides unique coating powders suitable for the preparation of protective films comprising an intimate mixture of a caprolactam-blocked organic polyisocyanate together with a hydroxy-containing polyester, or a hydroxy-containing acrylic or methacrylic polymer derived from hydroxy lower alkyl acrylate or methacrylate, a lower alkyl acrylate or methacrylate, and optionally styrene or vinyl toluene. It is also possible to utilize the caprolactam-blocked orgainc polyisocyanate with mixtures of the hydroxy-containing polyesters and hydroxy-containing acrylic or methacrylic polymers as defined herein. The polyisocyanate is present in sufficient amounts to provide from about 0.8 to 1.20 blocked isocyanate groups for each hydroxy group in the mixture. Upon heating the coating powder, the caprolactam-blocked organic polyisocyanate dissociates, thereby liberating the polyisocyanate and the blocking ε-caprolactam. The liberated polyisocyanate thereupon reacts with the hydroxy-containing polyester or acrylic or methacrylic polymer forming a protective film containing urethane linkages. The powder is particularly suitable for use where electrostatic spraying is desired, especially since the powder is a non-caking material.

The caprolactam-blocked organic isocyanates are readily prepared by reacting the ε-caprolactam and a polyisocyanate in a 1:1 equivalent ratio with an appropriate catalyst, such as triethylene diamine, dibutyl tin dilaurate, dibutyl tin diacetate, dibutyl tin dichloride, and stannous octoate, under preferably anhydrous conditions. The polyisocyanate and the ε-caprolactam can either be reacted directly or in a suitable reaction inert solvent such as toluene, methylethyl ketone, o-dichlorobenzene, a xylene, and the like. If solvent is used, however, it should be thoroughly removed from the product in order to minimize caking of the resultant prepolymer. The reaction can be carried out at elevated or room temperatures and is preferably carried out under an inert atmosphere such as nitrogen or carbon dioxide.

As will be appreciated by those skilled in the art, if the reaction is carried out at higher temperatures, e.g. 160°–170°C, the blocked polyisocyanate will form at a much faster rate. The time necessary for complete reaction will vary from a few minutes up to several hours or more depending upon the temperature and conditions used. Completion of reaction can be easily determined by analyzing for the presence of free isocyanate groups. This can simply be done by infrared spectroscopy or well known chemical methods.

A wide variety of organic polyisocyanates can be used in practicing the invention. Thus, aliphatic or aromatic polyisocyanates can be used, or alternatively, various polyisocyanate prepolymers can be utilized.

Among the aliphatic or aromatic polyisocyanates that can be used include, but are not limited to, isophorone diisocyanate, 4,4'-methylene bis-(cyclohexyl isocyanate), toluene diisocyanate, tetramethylene diisocyanate, pentamethylene diisocyanate, hexamethylene diisocyanate, propylene-1,2-diisocyanate, butylene-1,2-diisocyanate, ethylene-diisocyanate, cyclopentylene-1,3-diisocyanate, cyclohexylene-1,3-diisocyanate, m-phenylene diisocyanate, p-phenylene diisocyanate, 4,4'-diphenyl diisocyanate, 1,5-napthalene diisocyanate, toluene trisisocyanate, 1,4-xylene diisocyanate, and 4,4'-diphenyl methyl diisocyanate. Of the aliphatic and aromatic polyisocyanates that can be used, isophorone diisocyanate and 4,4'-methylene bis-(cyclohexyl isocyanate) are especially preferred.

Among the polyisocyanate prepolymers that can be used is practicing the invention are those derived from the reaction of a hydroxy-containing polyester with one or more of the conventional aliphatic or aromatic polyisocyanates cited above. The polyisocyanate prepolymers derived from the hydroxy-containing polyesters are conventionally obtained by reacting hydroxy-polyesters with the aliphatic or aromatic polyisocyanate, such as isophorone diisocyanate, to provide a prepolymer having terminal isocyanate groups. The hydroxy polyester is reacted with the aliphatic or aromatic polyisocyanate in an amount to provide a ratio of one equivalent of polyester, based upon the number of hydroxyl groups present in the polyester, to at least two equivalents of the polyisocyanate. The resultant polyisocyanate prepolymer is then reacted in the normal manner with ε-caprolactam to block the free isocyanate groups.

The hydroxy-containing polyesters that can be used in practicing the invention are those well known to those skilled in the art and can be prepared in the usual manner by reacting one or more polyhydric alcohols having at least two hydroxyl groups with one or more dibasic acids, or their corresponding lower alkyl esters or anhydrides.

Typical polyhydric alcohols which can be used include ethylene glycol, glycerine, diethylene glycol, trimethylol propane, triethylol propane, trimethylol ethane, pentaerythritol, and neopentyl glycol.

Among the aromatic dibasic acids and anhydrides and their esters that can be used include phthalic acid or anhydride, terphthalic acid and isophthalic acid. The corresponding lower alkyl esters of these acids can be used as well.

Aliphatic diacids that can be used include adipic acid, sebacic acid and succinic acid. It will be appreciated by those skilled in the art that the lower alkyl esters of these acids can be used, particularly those prepared from alcohols containing up to 6 carbon atoms.

An especially preferred polyhydroxy-containing polyester that can be used is poly (ε-caprolactone). This material is commercially available from the Union Carbide Corporation, New York, New York (PCP-0300) and is generally prepared by reacting ε-caprolactone with a compound containing a labile hydrogen, such as a polyol or a polyamine. The resulting product has a plurality of terminal hydroxyl groups, as is shown in the formula below $$HO-R-OH + 2n \begin{bmatrix} C=O \\ CH_2 \\ O \end{bmatrix} \rightarrow H-\left[OCH_2(CH_2)_4\overset{O}{\underset{\|}{C}}\right]_n-O-R-O-\left[\overset{O}{\underset{\|}{C}}-(CH_2)_4CH_2O\right]_n-H$$

R = lower alkyl
n = lower integer

The resulting poly (ε-caprolactone) is then reacted with an aromatic or aliphatic polyisocyanate to give the desired polyisocyanate prepolymer as shown in the formula below:

$$H-\left[O-CH_2(CH_2)_4\overset{O}{\underset{\|}{C}}\right]_n-O-R-O-\left[\overset{O}{\underset{\|}{C}}-(CH_2)_4CH_2O\right]_n-H + OCNArNCO \rightarrow$$

$$OCNArN-\overset{H}{\underset{}{}}\overset{O}{\underset{\|}{C}}-\left[O-CH_2(CH_2)_4\overset{O}{\underset{\|}{C}}\right]_n-O-R-O\left[\overset{O}{\underset{\|}{C}}-(CH_2)_4CH_2-O\right]_n-\overset{O}{\underset{\|}{C}}-\overset{H}{\underset{}{N}}ArNCO$$

Ar = Aryl group, e.g. phenyl.

The resulting polyisocyanate prepolymer is then reacted with ε-caprolactam to give the blocked polyisocyanate.

Besides the polyisocyanate prepolymers derived from the condensation of the hydroxy-containing polyesters and the aliphatic and aromatic polyisocyanates, polyisocyanate prepolymers derived from the condensation of polyhydric alcohols and one or more of the conventional aliphatic or aromatic polyisocyanates described above can be used as well. Typical of the polyols that can be condensed with the aliphatic or aromatic polyisocyanates include glycerol, trimethylol ethane, trimethylol propane, and neopentyl glycol. Sufficient polyisocyanate is reacted with the polyhydric alcohol such that all of the hydroxy groups of the polyhydric alcohol are reacted with the polyisocyanate to give a prepolymer containing free terminal isocyanate groups, which are then blocked with the ε-caprolactam.

It will also be appreciated by those skilled in the art that the ε-caprolactam-blocked organic polyisocyanates can comprise a mixture of ε-caprolactam-blocked aliphatic or aromatic polyisocyanates of the type indicated hereinabove.

It should be further understood that mixtures of aliphatic or aromatic polyisocyanates and the polyisocyanate prepolymer prepared from the reaction of such aliphatic and aromatic polyisocyanates and the hydroxy-containing polyesters and the polyhydric alcohols can be used as well in preparing the caprolactam-blocked organic polyisocyanates. Indeed, an especially preferred embodiment of the invention comprises a 1:1 molar mixture of a caprolactam-blocked polyisocyanate prepolymer and a caprolactam-blocked aliphatic or aromatic diisocyanate. It has been found that where a caprolactam-blocked polyisocyanate is prepared from an aliphatic or aromatic polyisocyanate the viscosity of the reaction mixture can be reduced by using such a 1:1 molar ratio.

In preparing the polyisocyanate prepolymer from the condensation of a polyhydric alcohol and a typical aliphatic or aromatic diisocyanate, the polyhydric alcohol and the isocyanate are mixed together, generally under an inert atmosphere, e.g. carbon dioxide or nitrogen, with heating, usually between 90° to 110°C. After the prepolymer has formed, catalyst is added, e.g. triethylene diamine, followed by the ε-caprolactam. The mixture is then heated to about 165° ± 5°C for 3 to 4 hours. At the end of this time, molten caprolactam-blocked organic polyisocyanate has formed and is removed from the reaction flask and allowed to cool to room temperature to give a non-caking solid.

In preparing the polyisocyanate prepolymers from the hydroxy-containing polyesters and one or more aliphatic or aromatic polyisocyanates, essentially the same procedure is followed. Thus, the hydroxy-containing polyester is usually first prepared in the conventional manner, after which the polyisocyanate is added followed by the catalyst and ε-caprolactam.

The caprolactam-blocked organic polyisocyanates are then blended with a solid, hydroxy-containing polyester or a hydroxy-containing acrylic or methacrylic resin derived from a hydroxy lower alkyl acrylate or methacrylate, a lower alkyl acrylate or methacrylate, and optionally styrene or vinyl toluene. The preferred hydroxy lower alkyl acrylates or methacrylates or lower alkyl acrylates or methacrylates contain up to six carbon atoms in the alcohol protion of the esters. Among the preferred hydroxy lower alkyl acrylates and methacrylates are included hydroxyethyl acrylate and methacrylate and hydroxypropyl acrylate and methacrylate.

As with the hydroxy-containing polyester used in preparing the polyisocyanate prepolymers above, the hydroxy-containing polyesters used to blend with the caprolactam-blocked organic polyisocyanates are prepared in the usual way and include the conventional polyhydroxy polyesters obtained by the condensation of polybasic organic acids with polyhydric alcohols.

The hydroxy-containing acrylic or methacrylic polymers are also prepared in the conventional manner.

The hydroxy-containing acrylic or methacrylic polymers can be prepared from the polymerization reaction of hydroxy lower alkyl acrylates or methacrylates with lower alkyl acrylates or methacrylates and optionally styrene. Additionally various mixtures of these components can be used.

Where the polymer is derived from hydroxy lower alkyl acrylates or methacrylates and lower alkyl acrylates or methacrylates, the preferred range of monomers is 15–25% by weight of the hydroxy lower alkyl acrylate or methacrylate and 75–85% by weight of the lower alkyl acrylate or methacrylate.

In the three component system where styrene is included, the preferred ranges are by weight, 10–30% hydroxy lower alkyl acrylate or methacrylate, 35–45% lower alkyl acrylate or methacrylate and 35–45% of styrene or vinyl toluene. An especially preferred hydroxy-containing acrylic polymer is one derived from about 20% hydroxypropyl acrylate, 20% butyl methacrylate, 20% isobutyl methacrylate, and 40% styrene.

After the caprolactam-blocked organic polyisocyanate is prepared, it is then blended with the solid hydroxy-containing polyester or acrylic or methacrylic resin in an amount such that there is an 0.8:1.0 to 1.2:1.0 NCO:OH equivalent ratio.

The formulation is usually blended with a ball mill or extruded and ground to a fine powder. The coating powders of the present invention can advantageously be electrostatically sprayed and when cured at 325°F to 400°F for about 20 to 40 minutes produces a film having excellent solvent and mar resistance and permits the formation of a high gloss film which does not have surface patterns or discolorations. Further, the coating powders of the present invention exhibit stability at ambient temperature without caking or cold flowing.

The following examples are provided to illustrate the invention more fully; however, they should not be construed as limiting the scope of the invention, many variations of which are contemplated.

Preparation of ε-Caprolactam-Blocked Organic Polyisocyanates

EXAMPLE 1

Into a three liter resin flask is added 134 grams (1 mole) of trimethylol propane and 888 grams (4 moles) of isophorone diisocyanate. The mixture is heated under a carbon dioxide atmosphere with agitation to 100°C ± 10°C and kept at this temperature for about three hours. At the end of this time, 0.16 gram of triethylene diamine is added, followed, after a half hour, by 565 grams (5 moles) of ε-caprolactam.

The temperature of the mixture is raised to 165°C ± 5°C and kept at this temperature for about an additional 3 hours. At the end of this time the ε-caprolactam-blocked organic polyisocyanate is removed and allowed to cool to room temperature. the resulting solid product has a melting point of 108°C and an equivalent weight of 317.

EXAMPLE 2

Following the procedure of Example 1, 181 grams (1 equivalent) of Union Carbide's poly(ε-caprolactone), PCP-0300 is reacted with 222 grams (2 equivalents) of isophorone diisocyanate. After heating the mixture under a carbon dioxide atmosphere with agitation at 100°C ± 10°C for 3 hours, 0.05 grams of triethylene diamine are added. After continuing the reaction for an additional half hour 115 grams (1 equivalent) of ε-caprolactam is added and the temperature raised to 155°C ± 5°C and maintained at that temperature for an additional 3 hours.

The caprolactam-blocked polyisocyanate is removed from the flask and cooled to room temperature. The equivalent weight of the solid product is 518 and the melting point about 83°C

EXAMPLE 3

Following substantially the procedures of Examples 1 and 2, the following materials are reacted:

| | | |
|---|---|---|
| Glycerine | 1.0 moles | 92 grams |
| Isophorone diisocyanate | 4.0 moles | 888 grams |
| Dibutyl tin diacetate | | 0.15 grams |
| ε-caprolactam | 5.0 moles | 565 grams |
| Equivalent weight of caprolactam-blocked polyisocyanate 309 | | |
| Melting point 112°C. | | |

EXAMPLE 4

Following substantially the procedures of Examples 1 and 2, the following materials are reacted:

| | | |
|---|---|---|
| Trimethylol propane | 1.0 mole | 134 grams |
| Isophorone diisocyanate | 3.0 mole | 666 grams |
| Dibutyl tin dilaurate | | 0.15 gram |
| Toluene Diisocyanate | 1.0 mole | 178 grams |
| ε-caprolactam | 5.0 mole | 565 grams |
| Equivalent weight of caprolactam-blocked polyisocyanate 309 | | |
| Melting point 113°C. | | |

EXAMPLE 5

Following substantially the procedures of Examples 1 and 2, the following materials are reacted:

| | | |
|---|---|---|
| Trimethylol propane | 1.0 mole | 134 grams |
| 4,4'-methylene bis-(cyclohexyl isocyanate) | 4.0 mole | 1056 grams |
| Dibutyl tin dilaurate | | 0.18 gram |
| ε-caprolactam | 5.0 mole | 565 grams |
| Equivalent weight of caprolactam-blocked polyisocyanate 351 | | |
| Melting point 104°C. | | |

EXAMPLE 6

To a 3 liter flask equipped with an agitator, boiling water condenser, thermometer and carbon dioxide blow tube is added 268 grams of trimethylol propane (2.0 moles) and 146 grams of adipic acid (1.0 mole). The reactants are heated at a maximum kettle temperature of 230°C ± 5°C to provide hydroxy-containing polyester which is kept for a maximum acid number of 2, at which time the resin is cooled to room temperature.

Under a carbon dioxide atmosphere, 888 grams (4.0 moles) of isophorone diisocyanate are added and the flask heated to 100°C ± 10°C with agitation, and kept at this temperature for about three hours. After this period of time 0.18 grams of triethylene diamine are added, and after an additional one-half hour 460 grams (4.0 moles) of ε-caprolactam are added. The temperature is increased to 165°C ± 5°C and the reaction mixture kept at this temperature for about an additional three hours.

The resultant caprolactam-blocked polyisocyanate prepolymer is then cooled to room temperature and removed from the flask. Melting point 123°C, equivalent weight 440.

EXAMPLE 7

Into a 3 liter flask is added 342 grams (3.0 moles) of ε-caprolactone, 134 grams (1.0 mole) of trimethylol propane, and 0.75 gram of stannous octoate. The mixture is kept at 180°C ± 5°C for about 3 hours. The resultant resin forms by transesterification and therefore no water loss or acid number is present.

The resultant resin is treated with 666 grams of isophorone diisocyanate (3.0 moles) and 345 grams (3.0 moles) of ε-caprolactam according to the procedure of Example 6.

The equivalent weight of the resulting caprolactam-blocked polyisocyanate prepolymer is 499 and the melting point is about 91°C.

Preparation of Hydroxy-containing Polyesters And Acrylic And Methacrylic Polymers

EXAMPLE 8

Preparation of Hydroxy-Containing Polyester

Terephthalic acid (2.0 moles; 57.34%), neopentyl glycol (2.0 moles; 36.33%), trimethylol ethane (0.3 moles; 6.23%) and dibutyl tin oxide (0.10%) are condensed to provide a hydroxy-containing polyester resin having an equivalent weight of about 534 and a melting point of about 106°C.

EXAMPLE 9

Preparation of Hydroxy-Containing Acrylic Polymer

Hydroxy-propyl acrylate (20.5%), styrene (40.0%), butyl methyacrylate (20.0%), and isobutyl methacrylate (19.5%) are reacted to give a hydroxy-containing acrylic polymer having an equivalent weight of 791 and a melting point of about 92°C.

Preparation of Coating Powders

EXAMPLE 10

Five hundred and thirty-four grams of the polyester prepared according to Example 8 is blended with 317 grams of the caprolactam-blocked organic polyisocyanate prepared according to Example 1. The resulting intimate mixture has a 1.0:1.0 NCO:OH equivalent ratio. The components of the mixture are either ball-milled or extruded and ground to a fine powder. When this fine powder is electrostatically sprayed and cured at 350°F for about 20 minutes, there is produced a protective film having excellent solvent and mar resistance.

EXAMPLE 11

Seven hundred and ninety-one grams of the hydroxy-containing acrylic polymer prepared according to Example 9 is blended with 317 grams of the caprolactam-blocked organic polyisocyanate prepared according to Example 1. The resulting intimate mixture has a 1.0:1.0 NCO:OH equivalnt ratio. The components of the mixture are either ball-milled or extruded and ground to a fine powder. When this fine powder is electrostatically sprayed and cured at 350°F for about 20 minutes, there is produced a protective film having excellent solvent and mar resistance.

EXAMPLE 12

Following substantially the procedure of Example 10, the caprolactam-blocked organic polyisocyanates of Examples 2–7 are blended with the appropriate amount of the hydroxy-containing polyester and acrylic polymer of Examples 8 and 9, respectively, to give coating powders which when sprayed and cured provide protective films having outstanding solvent and mar resistant properties.

What is claimed is:

1. A coating powder for use in the preparation of protective films which comprises an intimate mixture of:
    i. a caprolactam-blocked organic polyisocyanate and
    ii. A film-forming hydroxy-containing polyester, or a film-forming hydroxy-containing polymer obtained by reacting from 10–30 parts of a hydroxy lower alkyl acrylate or methacrylate, from 35–45 parts of a lower alkyl acrylate or methacrylate and from 35–45 parts of styrene or vinyl toluene, wherein the polyisocyanate is present in sufficient quantity to provide from about 0.8 to 1.20 blocked isocyanate groups for each hydroxy group in the coating powder, the caprolactam-blocked organic polyisocyanate component (i) being a 1:1 molar mixture of
        (a) a caprolactam-blocked aliphatic or aromatic polyisocyanate selected from the group consisting of isophorone diisocyanate, 4,4'-methylene bis-(cyclohexyl isocyanate), toluene diisocyanate, tetramethylene diisocyanate, pentamethylene diisocyanate, hexamethylene diisocyanate, propylene-1,2-diisocyanate, butylene-1,2-diisocyanate, ethylene diisocyanate, cyclopentylene-1,3-diisocyanate, cyclohexylene-1,3-diisocyanate, m-phenylene diisocyanate, p-phenylene diisocyanate, 4,4'-diphenyl diisocyanate, 1,5-napthalene diisocyanate, 2,4-toluene diisocyanate, 2,6-toluene diisocyanate, toluene trisisocyanate, 1,4-xylene diisocyanate, and 4,4'-diphenylmethane diisocyanate; and
        (b) a caprolactam-blocked polyisocyanate prepolymer derived from the condensation of a polyhydric alcohol and one or more of the polyisocyanates in (a).

2. The coating powder of claim 1 wherein the caprolactam-blocked polyisocyanate is a mixture of caprolactam-blocked toluene diisocyanate and a caprolactam-blocked polyisocyanate prepolymer derived from the condensation of trimethylol propane and isophorone diisocyanate.

3. The coating powder of claim 1 wherein the hydroxy-containing polyester in (ii) is derived from terephthalic acid or lower alkyl esters thereof, neopentyl glycol and trimethylol ethane.

4. The coating powder of claim 1 wherein the hydroxy-containing acrylic polymer is derived from hydroxypropyl acrylate, butyl methacrylate, isobutyl methacrylate and styrene.

* * * * *